US012385540B2

(12) United States Patent
Tarandek et al.

(10) Patent No.: US 12,385,540 B2
(45) Date of Patent: Aug. 12, 2025

(54) FRICTION BRAKE SYSTEM FOR A VEHICLE

(71) Applicant: HL MANDO CORPORATION, Pyeongtaek-si (KR)

(72) Inventors: Kristijan Tarandek, Neu-Isenburg (DE); I-Che Chiang, Frankfurt am Main (DE); Hans-Jörg Feigel, Rosbach (DE)

(73) Assignee: HL MANDO CORPORATION, Pyeongtaek-si (KR)

( * ) Notice: Subject to any disclaimer, the term of this patent is extended or adjusted under 35 U.S.C. 154(b) by 555 days.

(21) Appl. No.: 17/671,860

(22) Filed: Feb. 15, 2022

(65) Prior Publication Data
US 2022/0260125 A1    Aug. 18, 2022

(30) Foreign Application Priority Data

Feb. 18, 2021  (DE) ..................... 10 2021 201 570.0
Dec. 15, 2021  (DE) ..................... 10 2021 214 437.3

(51) Int. Cl.
*F16D 65/56* (2006.01)
*B60T 1/06* (2006.01)
(Continued)

(52) U.S. Cl.
CPC ............ *F16D 65/567* (2013.01); *B60T 1/065* (2013.01); *B60T 13/746* (2013.01);
(Continued)

(58) Field of Classification Search
CPC ............... F16D 65/567; F16D 2125/36; F16D 2125/40; F16D 55/226; F16D 2121/24; F16D 2127/02; B60T 1/065; B60T 13/746
(Continued)

(56) References Cited

U.S. PATENT DOCUMENTS 5,123,505 A * 6/1992 Antony ................ F16D 65/567
188/71.9
6,971,484 B2 * 12/2005 Sekiguchi ............. F16D 65/18
188/72.7
(Continued)

FOREIGN PATENT DOCUMENTS

DE           4031616 C2 * 11/1999 ........... F16D 65/567
DE     199 22 333 A1    11/2000
(Continued)

OTHER PUBLICATIONS

Office Action dated Nov. 20, 2024 for corresponding German Patent Application No. 10 2021 214 437.3, along with an English machine translation (21 pages).

*Primary Examiner* — Melody M Burch
(74) *Attorney, Agent, or Firm* — Hauptman Ham, LLP

(57) ABSTRACT

Disclosed herein a friction brake system comprises a braking member connectable to at least one brake pad and configured for pressing the brake pad against a friction surface and a transmission unit configured for converting a rotary motion generated by an actuator into a braking motion of the brake pad wherein the transmission unit comprises a ball-in-ramp assembly having a first plate with at least one groove, a second plate with at least one groove facing the groove of the first plate, and at least one ball arranged between the first plate and the second plate wherein the ball is retained by the groove of the first plate and the groove of the second plate, wherein the ball-in-ramp assembly is configured to convert a rotary motion of the first plate into a translational motion of the second plate relative to the first plate.

17 Claims, 2 Drawing Sheets

(51) Int. Cl.
  *B60T 13/74*      (2006.01)
  *F16D 55/226*     (2006.01)
  *F16D 121/24*         (2012.01)
  *F16D 125/36*         (2012.01)
  *F16D 127/02*         (2012.01)

(52) U.S. Cl.
  CPC ........ *F16D 55/226* (2013.01); *F16D 2121/24* (2013.01); *F16D 2125/36* (2013.01); *F16D 2127/02* (2013.01)

(58) Field of Classification Search
  USPC ....................................................... 188/72.8
  See application file for complete search history.

(56) References Cited

U.S. PATENT DOCUMENTS

| | | | | |
|---|---|---|---|---|
| 2003/0042084 A1* | 3/2003 | Kawase | ................ | F16D 55/00 188/72.1 |
| 2004/0262098 A1* | 12/2004 | Baumann | ................ | F16D 65/58 188/72.8 |
| 2009/0133975 A1* | 5/2009 | Gilles | .................... | F16D 65/18 188/72.6 |
| 2010/0243387 A1* | 9/2010 | Vollert | ................. | F16D 65/567 188/156 |
| 2011/0291503 A1* | 12/2011 | Wolf | ...................... | H02K 7/085 188/67 |
| 2012/0292141 A1* | 11/2012 | Takahashi | .............. | F16D 65/18 188/72.3 |
| 2015/0323026 A1* | 11/2015 | Yasui | .................... | F16H 25/186 74/89 |
| 2016/0355169 A1* | 12/2016 | Ohlig | .................... | B60T 13/741 |
| 2018/0087590 A1* | 3/2018 | Chelaidite | ............ | F16D 55/226 |

FOREIGN PATENT DOCUMENTS

| | | |
|---|---|---|
| DE | 102 39 793 A1 | 3/2003 |
| DE | 10 2011 086 152 A1 | 2/2013 |
| DE | 10 2015 214 547 A1 | 2/2016 |

* cited by examiner

FRICTION BRAKE SYSTEM FOR A VEHICLE

CROSS-REFERENCE TO RELATED APPLICATIONS

This application claims priority under 35 U.S.C. § 119 to German Provisional Patent Application No. 10 2021 201 570.0, filed on Feb. 18, 2021, and German Non-Provisional Patent Application No. 10 2021 214 437.3, filed on Dec. 15, 2021, in the German Patent and Trademark Office (DPMA), the contents of which are herein incorporated by reference in their entirety

TECHNICAL FIELD

The application relates to a friction brake system for a vehicle. In addition, the application relates to a service brake for a vehicle. More precisely, the application relates to a friction brake system comprising a braking member connectable to at least one brake pad and configured for pressing the brake pad against a friction surface and a transmission unit configured for converting a rotary motion generated by an actuator into a braking motion of the brake pad. The friction brake system is suitable for pad wear compensation.

BACKGROUND ART

Friction brake systems of this kind, in particular electro-mechanically actuated wheel brakes, are known. For example, such types of brakes may be used as integrated park brakes or as service brakes. In order to achieve a braking motion with a sufficient clamping force in a certain time using an electro-mechanically actuated wheel brake, a certain motor power has to be provided. For example, with the use of a non-linear gear the required motor power can be reduced. The non-linear gear may be a knee-lever gear. However, such a type of gear is relatively spacious and difficult to integrate within a housing disposed adjacent the wheel brake. Another problem that may arise with known friction brake system is related to the effort that is needed for a pad wear compensation mechanism. Therefore, there is a need for an inexpensive, robust and small alternative to known friction brake systems.

SUMMARY

In view of the above-mentioned aspects, it is an object of the present application to provide an improved friction brake system for a vehicle. In particular, it is an object of the application to provide a friction brake system, which is compact, inexpensive and particularly robust. In addition, it is an object of the application to provide a service brake having these advantages.

This objective is achieved by a friction brake system for a vehicle comprising the features of independent claim 1. Optional further features and further developments will become apparent from the dependent claims and the detailed description in conjunction with the accompanying figures.

The proposed friction brake system for a vehicle comprises a braking member connectable to at least one brake pad and configured for pressing the brake pad against a friction surface. The friction surface may, e.g., be a surface of a brake disc, in particular of a wheel brake. The friction brake system also comprises a transmission unit configured for converting a rotary motion generated by an actuator into a braking motion of the brake pad. When the braking member executes the braking motion, typically the brake pad is pressed against the friction surface. The transmission unit comprises a ball-in-ramp assembly. The ball-in-ramp assembly comprises a first plate with at least one groove, a second plate with at least one groove facing the groove of the first plate, and at least one ball arranged between the first plate and the second plate. The ball is retained by the groove of the first plate and the groove of the second plate. The ball-in-ramp assembly is configured to convert a rotary motion of the first plate into a translational motion of the second plate relative to the first plate. Thereby, an axial spacing between the first plate and the second plate may be changed. Typically, when a brake of the vehicle is applied, an axial spacing between the first plate and the second plate is increased to generate a braking motion that exerts a force on the friction surface. To release the brake, the axial spacing between the first plate and the second plate may be decreased. The second plate is mechanically coupled with the braking member such that a rotation of the first plate causes the braking motion of the braking member. The friction brake system further comprises a spindle. The spindle comprises spindle threads engaging with threads on an inner surface of the first plate. The first plate may be threaded onto the spindle. The spindle is configured to be rotated by the actuator about a first angular range to cause the rotary motion of the first plate and thereby cause the braking motion of the braking member. The spindle is further configured to be rotated beyond the first angular range to cause a translational motion of the first plate relative to the spindle for pad wear adjustment. During the translational motion of the first plate relative to the spindle the spindle may rotate relative to the first plate. In most embodiments, the first plate does not rotate during the translational motion of the first plate relative to the spindle. Typically, the first plate performs the translational motion along a spindle axis.

In this manner, a simple, robust and compact mechanism is achieved that provides reliable braking operation and reliable pad wear adjustment. The spindle in conjunction with the actuator may in this way enable the reliable braking operation and reliable pad wear adjustment.

In typical embodiments, the friction brake system comprises a first stop. The first stop may be configured to prevent further rotation of the first plate when the spindle is rotated beyond the first angular range in a first rotation direction, thereby resulting in a translational motion of the first plate relative to the spindle in a first axial direction. When the first plate moves in the first axial direction, the first plate may, e.g., move toward the brake disc. In this manner, an air gap between the brake pad and the brake disc may decrease. The first stop can be arranged formed by a part of a housing of the friction brake system. The friction brake system may, e.g., comprise a caliper housing. The first stop may be formed by the caliper housing.

In some embodiments, the friction brake system comprises a second stop. The second stop may be configured to prevent further rotation of the first plate when the spindle is rotated beyond the first angular range in a second rotation direction opposite the first rotation direction, thereby resulting in a translational motion of the first plate relative to the spindle in a second axial direction opposite the first axial direction. When the first plate moves in the second axial direction, the first plate may, e.g., move away from the brake disc. In this manner, the air gap between the brake pad and the brake disk may increase.

In most embodiments, the friction brake system comprises a lock nut. The lock nut may have inner threads engaging with the spindle threads. The lock nut may be threaded onto the spindle. The lock nut may be configured to prevent a translational motion of the first plate, e.g., toward the lock nut and/or away from the lock nut, when the spindle is rotated about the first angular range. In this manner, the reliable braking operation is improved. The lock nut may rest on spindle such that the first plate is arranged between the lock nut and the actuator and/or such that the lock nut is arranged closer to the brake disc and/or brake pad than the first plate.

The lock nut may be configured to rotate relative to the spindle when the spindle is rotated beyond the first angular range for pad wear adjustment. In this manner, motion of the lock nut may enable the translational motion of the first plate for pad wear adjustment. The friction brake system may comprise a lock nut end stop configured to prevent further rotation of the lock nut when the spindle is rotated beyond the first angular range in the first angular direction to allow for the translational motion of the first plate relative to the spindle in the first axial direction.

The lock nut end stop may at least in part be formed by the second plate of the ball-in-ramp assembly. The second plate may be rotationally fixed and/or limited in its capability to perform a rotary motion. For example, the friction brake system may comprise a caliper housing. The second plate of the ball-in-ramp assembly may be coupled to the caliper housing by a torque support, which may prevent or limit rotational motion of the second plate.

In some embodiments, the lock nut end stop is configured to prevent further rotation of the lock nut when the spindle is rotated beyond the first angular range in the first angular direction prior to the prevention of the further rotation of the first plate by the first stop, thereby resulting in a translational motion of the lock nut away from the first plate prior to the translational motion of the first plate relative to the spindle in the first axial direction. In this manner, the lock nut may reliably release its locking function.

In most embodiments, the first plate and the lock nut are connected to one another by a spring, e.g., a torque spring. The spring may be configured to pull the lock nut and the first plate together. In this manner, the lock nut may be preloaded by the spring. In this way, efficient locking of the first plate may be achieved when the when the spindle is rotated about the first angular range to cause the braking motion. In addition, the spring may achieve reliable locking of the first plate after pad wear adjustment was made.

The ball-in-ramp assembly may comprise at least three grooves, in particular at least five grooves, of the first plate. Further, the ball-in-ramp assembly may comprise at least three, in particular at least five, grooves of the second plate. Correspondingly, the ball-in-ramp assembly may comprise at least three, in particular at least five, balls retained by pairs of the grooves of the first and second plates. Typically, each one of the balls is held by a pair of grooves, the pair comprising one groove of the first plate and one groove of the second plate. Any or all of the grooves of the first and/or second plate may have any or all of the features or characteristics described with respect to any groove above or below. The embodiment comprising at least three pairs of grooves and at least three balls provides a mechanically stable arrangement. The embodiment comprising at least five pairs of grooves and at least five balls enables a compact arrangement with a low installation height. In further embodiments, the grooves of the first plate and the grooves of the second plate have an identical shape at least in sections. In some embodiments, the grooves of the first and second plates are fully identical in shape.

A depth of the groove of at least one of the first plate and the second plate may increase between a first portion and a second portion of the groove in a non-linear manner such that a path defined by the groove is steeper in the first portion than in the second portion. Because the path is steeper in the first portion, a particular angular momentum exerted by the actuator is first converted into a comparatively large relative travel distance of the first and second plates and into a large travel distance of the brake pad, when the brake is initially applied. After the brake pad has travelled a particular distance, and in particular after contact of the brake pad with the friction surface has been made, the particular angular momentum is converted into a smaller relative travel distance of the brake pad. Therefore, a low gear ratio at ramp start is achieved by the proposed friction brake system. In this way, a sufficiently high clamping force can be obtained in a short time with a low required actuator power. When the brake is applied, the ball may move, in particular roll, from the first portion of the groove to the second portion of the groove.

Further, the ball-in-ramp assembly may be configured such that when the spindle is rotated beyond the first angular range to cause the translational motion of the first plate relative to the spindle for pad wear adjustment the ball is arranged in the second portion of the groove. Hence, a lower park clamping force may be achieved. In some embodiments, a depth of the groove is neutral in the second portion. The groove may therefore have a neutral pitch in the second portion. During pad wear adjustment, the ball is typically received in the second portion of the groove.

The braking member may comprise a piston connectable to the brake pad, which may, in some embodiments, be referred to as a first brake pad. The piston may transmit the translational motion of the second plate to the brake pad. The friction brake system may comprise the caliper housing. The caliper housing may be connectable to a second brake pad. Further, the caliper housing and the piston may each be coupled with one of the first plate and the second plate such that the caliper housing and the piston are configured to press the first and second brake pads against opposing surfaces of a brake disc when the braking member executes the braking motion. Typically, when the braking motion is performed, the piston and the caliper housing move in opposite directions.

In some embodiments, the friction brake system comprises a coil spring. The first plate may be supported by the coil spring. The coil spring may be arranged between the first plate and the caliper housing. The coil spring may be configured to push against the first plate in the direction of the second plate and/or the brake pad. In typical embodiments, the spindle rests on a rotatable support plate. The support plate may be rotatable by the actuator. The support plate may be rigidly connected with the spindle. In some embodiments, the friction brake system comprises a bearing, e.g., an axial needle bearing. The bearing may be arranged between the support plate and the caliper housing.

The friction brake system may also comprise the actuator. The actuator may comprise an electric motor configured to cause rotation of the spindle. The actuator may further comprise a gear. The spindle may be coupled to the electric motor via the gear. In some embodiments, the actuator is rigidly connected with the caliper housing.

The present application further relates to a vehicle brake, which is a service brake for a vehicle. The service brake may comprise a friction brake system having any or all of the features described above or below. Typically, the friction brake system is configured to reduce a rotational speed of a wheel by pushing the brake pad against the friction surface. In other embodiments, the application may relate to a vehicle brake, which is a parking brake for a vehicle. The parking brake may comprise the friction brake system described above or below. In this embodiment, the friction brake system is configured to keep the vehicle motionless when parked by pushing the brake pad against the friction surface.

BRIEF DESCRIPTION OF THE DRAWINGS

Exemplary embodiments will be described in conjunction with the following figures.

DETAILED DESCRIPTION OF EMBODIMENTS

Figure 1:
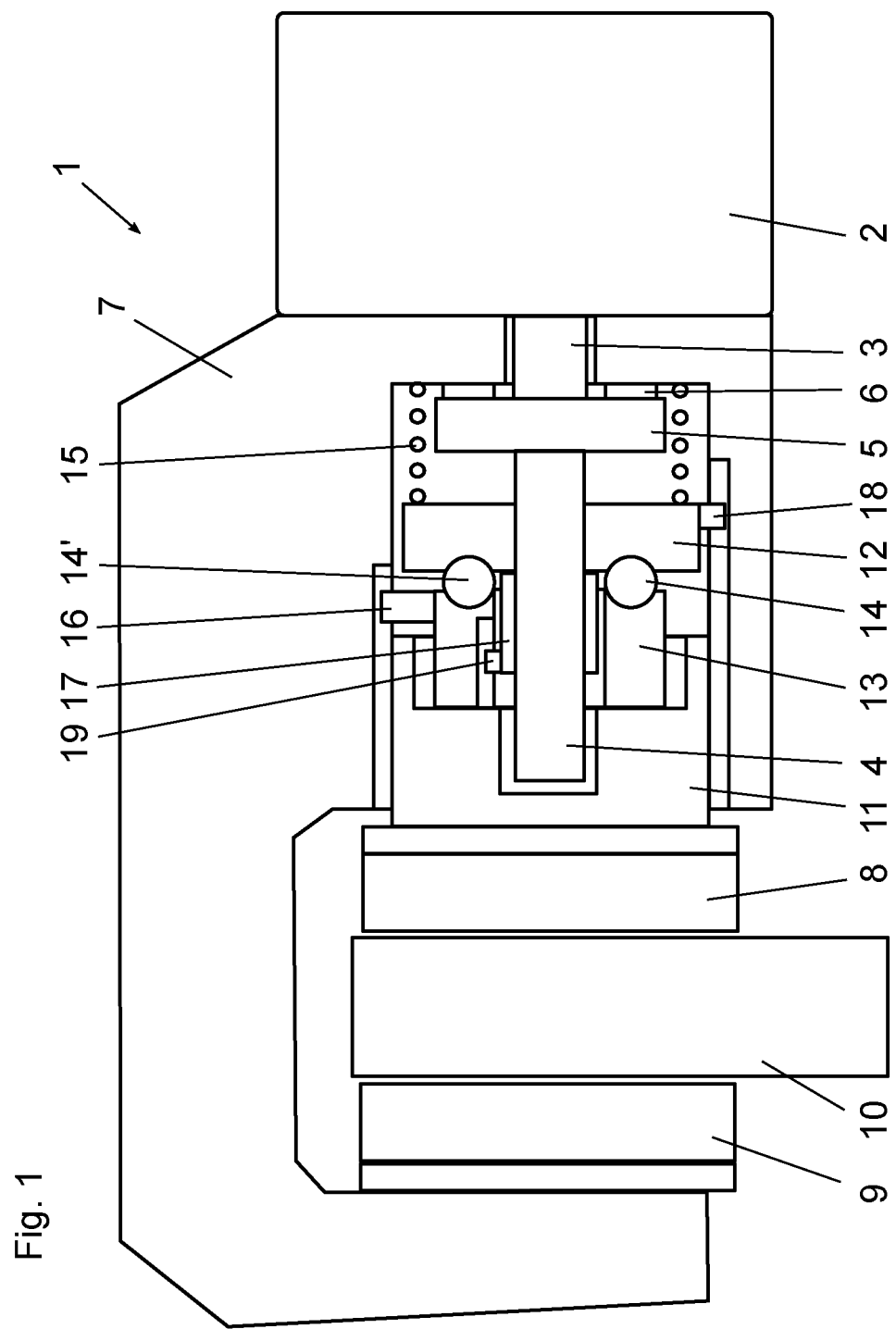
FIG. 1 shows a cross-sectional view of a friction brake system for a vehicle.

FIG. 1 shows a friction brake system 1 for a vehicle. The friction brake system 1 may be a component of a service brake or a park brake of the vehicle. The friction brake system 1 comprises an actuator 2 having gears and a rotatable output shaft 3. The rotatable output shaft 3 is rigidly connected to a rotatable spindle 4 via a rotatable support plate 5. The support plate 5 is supported by an axial needle bearing 6 arranged between the support plate 5 and a caliper housing 7 of a braking member. The rotary motion generated by the actuator 2 is converted into a braking motion, in which a first brake pad 8 and a second brake pad 9 are pushed against friction surfaces of a brake disc 10 of a wheel brake. To achieve the braking motion, a transmission unit converts the rotary motion generated by the actuator 2 into a translational motion of a piston 11 of the braking member holding the first brake pad 8 relative to the caliper housing 7, which holds the second brake pad 9.

The transmission unit comprises a ball-in-ramp assembly having a first plate 12 and a second plate 13 and balls 14, 14', e.g., a set of five balls, arranged between the first plate 12 and the second plate 13. The balls 14, 14' are arranged between the first plate 12 and the second plate 13 and each held by a pair of grooves arranged on surfaces of the first plate 12 and the second plate 13. The first plate 12 rests on the spindle 4 and has threads on an inner surface, which engage with spindle threads. In some embodiments, the plates 12, 13 are pushed against each other by a compression spring. Further, the return torque of the ball-in-ramp assembly may be increased by a turn spring acting between plates 12, 13. When the braking motion is performed, i.e., when the brake is applied, the first plate 12 rotates due to a rotation of the spindle 4. The rotation of the first plate 12 is converted into a translational motion of the second plate 13 by the ball-in-ramp assemble. The second plate 13 is connected with the piston 11. When the brake is applied, the second plate 13 moves toward the left relative to the caliper housing 7 to push the brake pads 8, 9 against the friction surfaces of the brake disc 10. The first plate 12 is further supported on the caliper housing 7 by a coil spring 15 arranged between a surface of the caliper housing 7 and a surface of the first plate 12. The second plate 13 is coupled to the caliper housing 7 by a torque support 16. The torque support 16 is formed in part by a protrusion of the second plate 13, which engages with a recess of the caliper housing 7 and thereby prevents rotation of the second plate 13. Further, a lock nut 17 is threaded on the spindle 4. The lock nut 17 is connected to the first plate 12 via a torsion spring (not depicted) and locks the first plate 12 relative to the spindle 4 during the braking motion.

To enable pad wear adjustment, the first plate 12 is coupled to the caliper housing 7 via a first stop 18. The first stop 18 is formed in part by a protrusion of the first plate 12, which engages with a recess of the caliper housing 7, when the spindle 4 is rotated beyond the angular range intended for braking. In this case, during further rotation of the spindle 4 by the actuator 2 the first stop 18 prevents the first plate 12 from rotating further, which leads to a translational motion of the first plate 12 with respect to the spindle 4. This translational motion is used to increase or decrease the air gap between the brake pads 8, 9 and the brake disc 10 for pad wear adjustment. To enable the translational motion of the first plate 12 for pad wear adjustment, the lock nut 17 may perform a translational motion as well. To enable the translational motion of the lock nut 17, a lock nut end stop 19 formed in part by a protrusion of the lock nut 17 configured to engage with a recess of the second plate 13, is provided. The lock nut end stop 19 is configured to prevent a rotary motion of the lock nut 17, when the spindle 4 is rotated for pad wear adjustment, thereby leading to a translational motion of the lock nut 17 that allows the first plate 12 to move translationally for pad wear adjustment.

Figure 2:
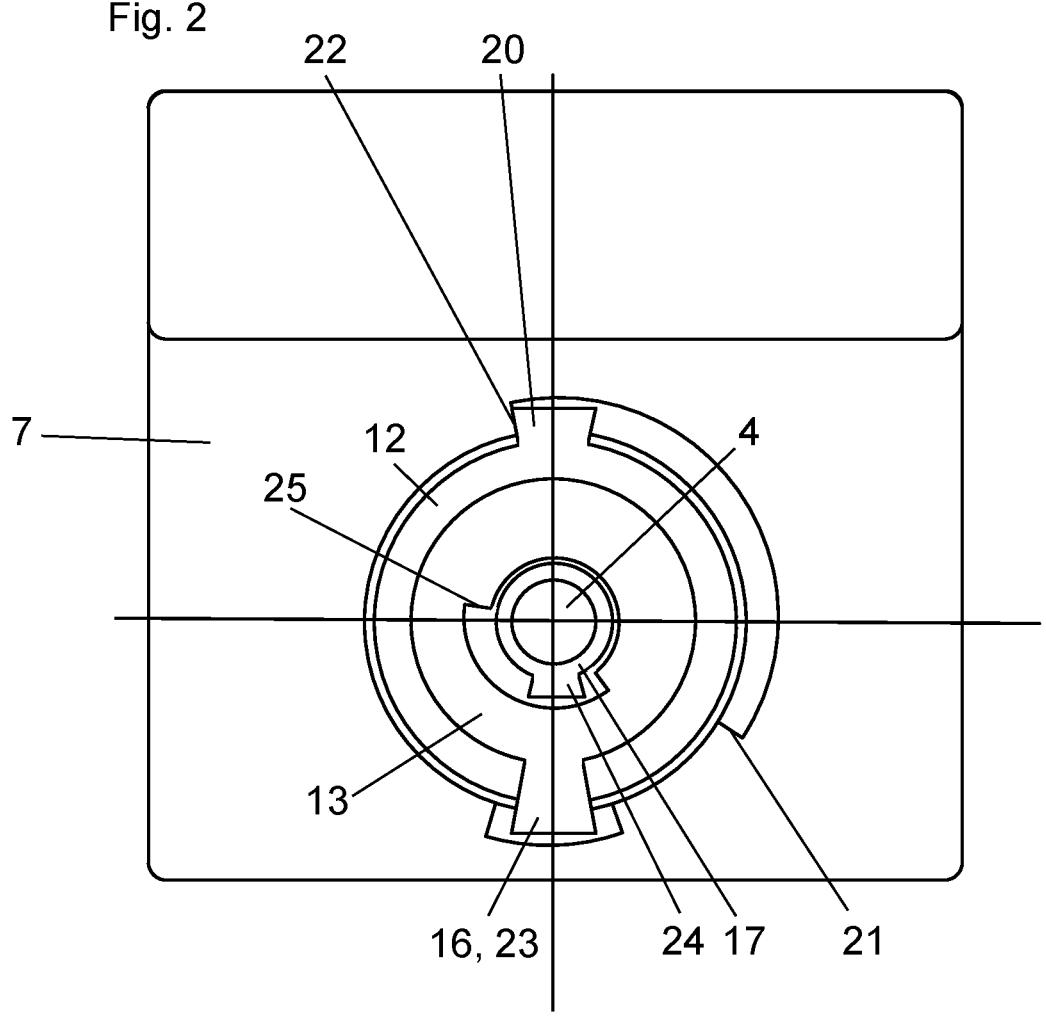
FIG. 2 shows another cross-sectional view of the friction brake system.

FIG. 2 shows another cross-sectional view of the friction brake assembly 1. Corresponding and reoccurring features shown in the different figures are denoted using the same reference numerals. The first stop 18, which couples the first plate 12 to the caliper housing 7 comprises a protrusion 20 formed on an outer surface of the first plate 12. The first stop 18 is further formed by a first stop surface 21 formed in the surface of the housing. When the spindle 4 is rotated in a clockwise direction beyond the point where the protrusion 20 comes into contact with the first stop surface 21, further rotation of the first plate 12 is prevented, and the first plate 12 performs a translational motion for pad wear adjustment, e.g., for decreasing the air gap between the brake pads 8, 9 and the brake disc 10. For pad wear adjustment in the opposite direction, e.g., for increasing the air gap, a second stop is formed by a second stop surface 22 and the protrusion 20 of the first plate 12. The second stop is configured to prevent further rotational motion of the first plate 12 in the anti-clockwise direction.

The torque support 16 of the second plate 13 is formed by a protrusion 23 on an outer surface of the second plate 13. The protrusion 23 of the second plate 13 engages with a recess in the caliper housing 7 and prevents rotation of the second plate 13. The lock nut end stop 19 is formed by a protrusion 24 on an outer surface of the lock nut 17 and a first lock nut surface 25 formed by an inner surface of the second plate 13. The lock nut end stop 19 is configured such that when the spindle 4 is rotated in the clockwise direction, the protrusion 24 of the lock nut 17 engages with the first lock nut surface 25 just before the first plate 12 is prevented from further rotation due to engagement of the protrusion 20 with the first stop surface 21.

Figure 3:
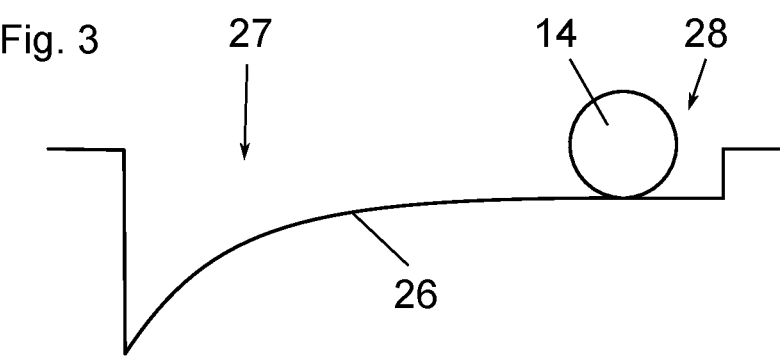
FIG. 3 shows a schematic sectional view of a groove and a ball of a ball-in-ramp assembly.

FIG. 3 shows a schematic view of a groove 26 of the first plate 12. The other grooves of the first plate 12 as well as the grooves of the second plate 13 are shaped correspondingly. The ball 14 is held within the groove 26 of the first plate 12 and a corresponding groove of the second plate 13. A depth of the groove 26 decreases from a first portion 27 of the groove 26 toward a second portion 28 of the groove 26. The depth of the groove 26 increases in a non-linear manner such that it is steeper in the first portion 27 than in the second portion 28. The depth of the groove 26 is constant in the second portion 28, e.g. for parking function. The first portion 27 of the groove 26 holds the ball 14 when the brake is not applied, and the second portion 28 of the groove 26 holds the ball when the brake is applied. When pad wear adjustment is performed, e.g., to decrease the air gap between the brake pads 8, 9 and the brake disc 10, the ball 14 is held within the second portion 28 of the groove 26.

According to the present application, a simple mechanism for pad wear compensation may be provided to drive the ball in ramp mechanism not directly by the actuator, but indirectly via a spindle gear. In case of a too big airgap the actuator can drive the spindle drive with the ball in ramp drive from its initial position in direction of full brake apply against a stop between the housing and the ball in ramp unit, which is causing a relative move between nut and spindle, which lead to a pad wear compensation. This is possible because also the locking friction torque caused by a lock nut will be released by the actuator. In case of a too small airgap the actuator can drive the spindle drive with the ball in ramp drive from its initial position in opposite direction against a first stop between the housing and the ball in ramp unit, which is causing a relative move between nut and spindle and opens the lock nut as well. In both cases the airgap change can be controlled regarding its size by position control of the actuator.

Features of the different embodiments which are merely disclosed in the exemplary embodiments may be combined with one another and may also be claimed individually.

What is claimed is:

1. A friction brake system for a vehicle, the friction brake system comprising:
    a braking member connectable to at least one brake pad and configured for pressing the at least one brake pad against a friction surface; and
    a transmission unit configured for converting a rotary motion generated by an actuator into a braking motion of the at least one brake pad,
    wherein the transmission unit comprises a ball-in-ramp assembly having:
        a first plate with at least one groove,
        a second plate with at least one groove facing the at least one groove of the first plate, and
        at least one ball arranged between the first plate and the second plate, wherein the at least one ball is retained by the groove of at least one of the first plate and the second plate,
    wherein the ball-in-ramp assembly is configured to convert a rotary motion of the first plate into a translational motion of the second plate relative to the first plate,
    wherein the second plate is mechanically coupled with the braking member such that a rotation of the first plate causes the braking motion of the braking member,
    wherein the friction brake system further comprises a spindle, wherein the spindle comprises spindle threads engaging with threads on an inner surface of the first plate,
    wherein the spindle is configured to be rotated by the actuator about a first angular range to cause the rotary motion of the first plate and thereby cause the braking motion of the braking member,
    wherein the spindle is configured to be rotated beyond the first angular range to cause a translational motion of the first plate relative to the spindle for pad wear adjustment,
    wherein the friction brake system further comprising a lock nut having inner threads engaging with the spindle threads, and
    wherein the lock nut is configured to prevent the translational motion of the first plate, when the spindle is rotated about the first angular range.

2. The friction brake system of claim 1, further comprising a first stop, wherein the first stop is configured to prevent further rotation of the first plate when the spindle is rotated beyond the first angular range in a first rotation direction, thereby resulting in a translational motion of the first plate relative to the spindle in a first axial direction.

3. The friction brake system of claim 2, further comprising a second stop, wherein the second stop is configured to prevent further rotation of the first plate when the spindle is rotated beyond the first angular range in a second rotation direction opposite the first rotation direction, thereby resulting in a translational motion of the first plate relative to the spindle in a second axial direction opposite the first axial direction.

4. The friction brake system of claim 1, further comprising a lock nut end stop configured to prevent further rotation of the lock nut when the spindle is rotated beyond the first angular range in a first rotation direction to allow for the translational motion of the first plate relative to the spindle in the first axial direction.

5. The friction brake system of claim 4, wherein the lock nut end stop is configured to prevent further rotation of the lock nut when the spindle is rotated beyond the first angular range in the first rotation direction prior to the prevention of the further rotation of the first plate by the first stop, thereby resulting in a translational motion of the lock nut away from the first plate prior to the translational motion of the first plate relative to the spindle in the first axial direction.

6. The friction brake system of claim 4, wherein the lock nut end stop is formed by the second plate of the ball-in-ramp assembly.

7. The friction brake system of claim 1,
    wherein a depth of the groove of at least one of the first plate and the second plate increases between a first portion and a second portion of the groove in a non-linear manner such that a path defined by the groove of at least one of the first plate and the second plate is steeper in the first portion than in the second portion, and
    wherein the ball-in-ramp assembly is configured such that when the spindle is rotated beyond the first angular range to cause the translational motion of the first plate relative to the spindle for pad wear adjustment, the at least one ball is arranged in the second portion of the groove of at least one of the first plate and the second plate.

8. The friction brake system of claim 7,
    wherein a depth of the groove of at least one of the first plate and the second plate is constant in the second portion.

9. The friction brake system of claim 1, further comprising a caliper housing, wherein the second plate of the ball-in-ramp assembly is coupled to the caliper housing by a torque support.

10. The friction brake system of claim 1, wherein
    the at least one brake pad includes a first brake pad and a second brake pad, and
    the braking member comprises a piston connectable to the first brake pad and a caliper housing connectable to the second brake pad, wherein the caliper housing and the piston are each coupled with one of the first plate and the second plate such that the caliper housing and the piston are configured to press the first and second brake pads against opposing surfaces of a brake disc when the braking member executes the braking motion.

11. A service brake for a vehicle, the service brake comprising: a friction brake system including
a braking member connectable to at least one brake pad and configured for pressing the at least one brake pad against a friction surface; and
a transmission unit configured for converting a rotary motion generated by an actuator into a braking motion of the at least one brake pad,
wherein the friction brake system is configured to reduce a rotational speed of a wheel by pushing the at least one brake pad against the friction surface,
wherein the transmission unit comprises a ball-in-ramp assembly having:
a first plate with at least one groove,
a second plate with at least one groove facing the at least one groove of the first plate, and
at least one ball arranged between the first plate and the second plate, wherein the at least one ball is retained by the groove of at least one of the first plate and the second plate,
wherein the ball-in-ramp assembly is configured to convert a rotary motion of the first plate into a translational motion of the second plate relative to the first plate,
wherein the second plate is mechanically coupled with the braking member such that a rotation of the first plate causes the braking motion of the braking member,
wherein the friction brake system further comprises a spindle, wherein the spindle comprises spindle threads engaging with threads on an inner surface of the first plate,
wherein the spindle is configured to be rotated by the actuator about a first angular range to cause the rotary motion of the first plate and thereby cause the braking motion of the braking member,
wherein the spindle is configured to be rotated beyond the first angular range to cause a translational motion of the first plate relative to the spindle for pad wear adjustment,
wherein the friction brake system further comprising a lock nut having inner threads engaging with the spindle threads, and
wherein the lock nut is configured to prevent the translational motion of the first plate, when the spindle is rotated about the first angular range.

12. The service brake of claim 11, wherein the friction brake system further comprises a first stop, wherein the first stop is configured to prevent further rotation of the first plate when the spindle is rotated beyond the first angular range in a first rotation direction, thereby resulting in a translational motion of the first plate relative to the spindle in a first axial direction.

13. The service brake of claim 12, wherein the friction brake system further comprises a second stop, wherein the second stop is configured to prevent further rotation of the first plate when the spindle is rotated beyond the first angular range in a second rotation direction opposite the first rotation direction, thereby resulting in a translational motion of the first plate relative to the spindle in a second axial direction opposite the first axial direction.

14. The service brake of claim 11, wherein the friction brake system further comprises a lock nut end stop configured to prevent further rotation of the lock nut when the spindle is rotated beyond the first angular range in a first rotation direction to allow for the translational motion of the first plate relative to the spindle in the first axial direction.

15. The service brake of claim 11,
wherein a depth of the groove of at least one of the first plate and the second plate increases between a first portion and a second portion of the groove of at least one of the first plate and the second plate in a non-linear manner such that a path defined by the groove of at least one of the first plate and the second plate is steeper in the first portion than in the second portion, and
wherein the ball-in-ramp assembly is configured such that when the spindle is rotated beyond the first angular range to cause the translational motion of the first plate relative to the spindle for pad wear adjustment, the at least one ball is arranged in the second portion of the groove of at least one of the first plate and the second plate.

16. The service brake of claim 11, wherein the friction brake system further comprises a caliper housing, wherein the second plate of the ball-in-ramp assembly is coupled to the caliper housing by a torque support.

17. The service brake of claim 11, wherein
the at least one brake pad includes a first brake pad and a second brake pad, and
the braking member comprises a piston connectable to the first brake pad and a caliper housing connectable to the second brake pad, wherein the caliper housing and the piston are each coupled with one of the first plate and the second plate such that the caliper housing and the piston are configured to press the first and second brake pads against opposing surfaces of a brake disc when the braking member executes the braking motion.

* * * * *